Feb. 26, 1935.   E. A. RUSSELL   1,992,446
HOSE COUPLER
Filed Dec. 5, 1933   2 Sheets-Sheet 1
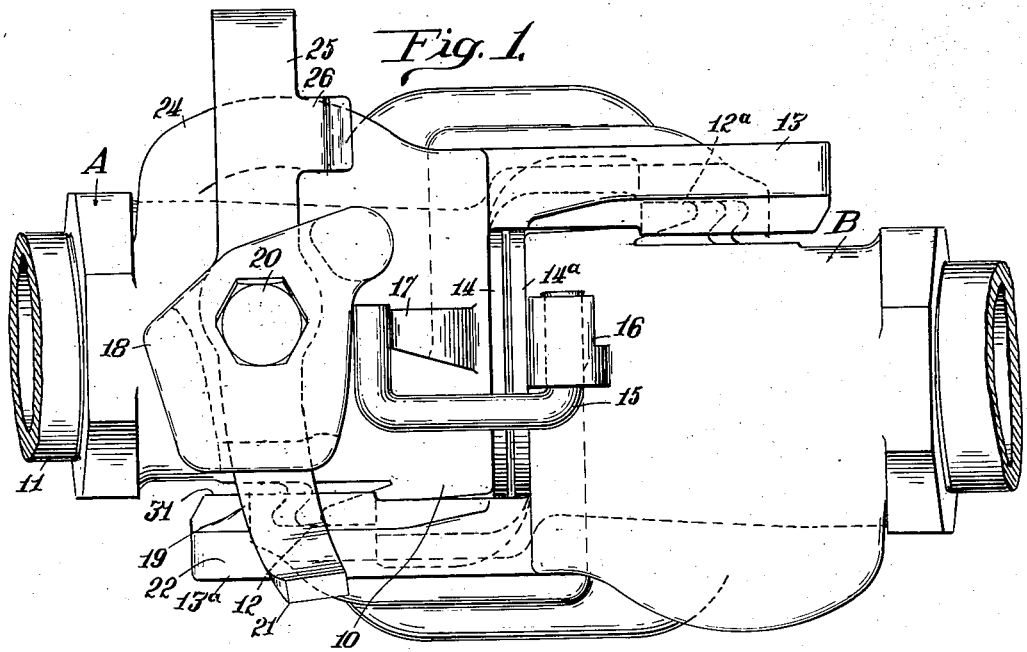
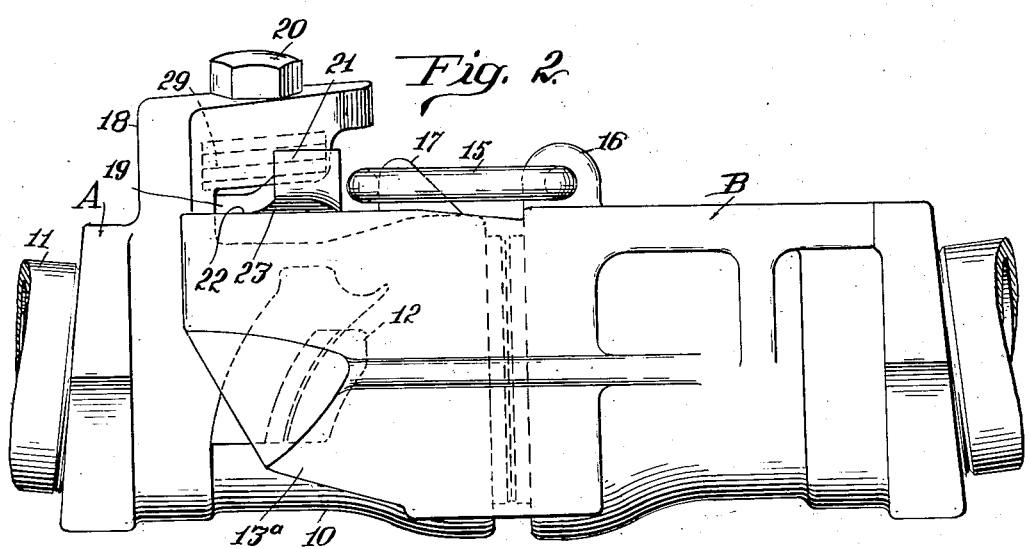
Inventor
Edward A. Russell
By Barnett & Truman
Attorneys

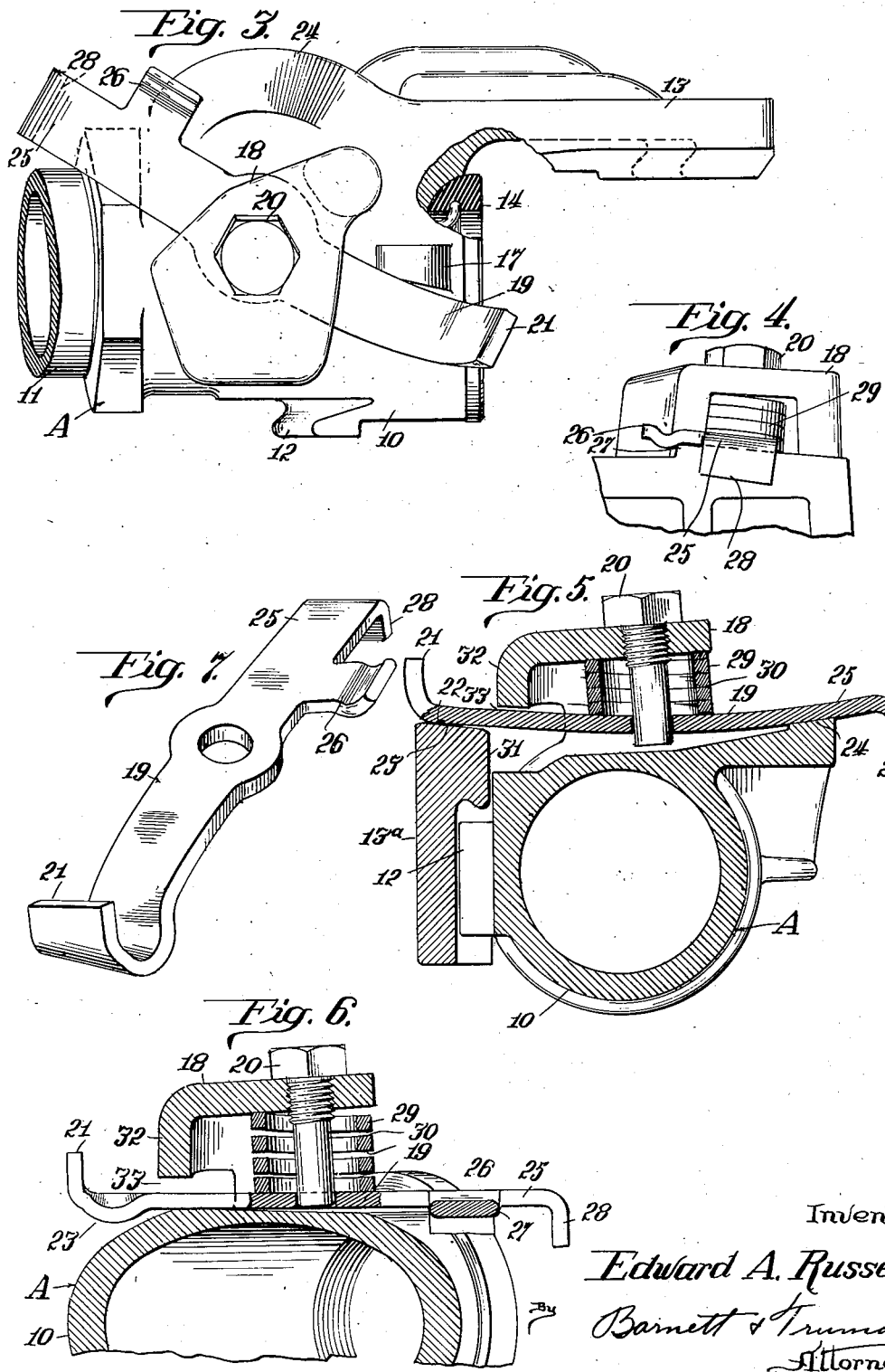

Patented Feb. 26, 1935

1,992,446

UNITED STATES PATENT OFFICE 1,992,446

HOSE COUPLER

Edward A. Russell, Chicago, Ill., assignor to Vapor Car Heating Company, Inc., Chicago, Ill., a corporation of New York Application December 5, 1933, Serial No. 700,969

3 Claims. (Cl. 285—68)

This invention relates to hose couplings for connecting together the hoses or other flexible conduit structures—steam or air—between railway cars, and more particularly to the provision of improved means for locking together the mating elements of such couplings.

It has been customary prior to this invention to provide hose couplings with locking devices to maintain the coupler members in interlocked relation against the tendency to be rocked on their cams and disengaged by pulls on the hoses when the train rounds a curve. Such locking devices usually involve some form of wedge action, either positive or resilient, on the coupler arms to force them down and hold them in their interlocked engagement with cam lugs formed on the mating coupler members.

Both classes of said locking devices present desirable and also undesirable features or locking effects. The locking devices embodying positive wedge elements are ordinarily efficient locks, but the wedging pressure, especially as the locks are frequently driven into place by a hammer, is likely to fracture or otherwise injure the gaskets of the coupler members and also to distort the coupler arms in a manner to impair the desired alignment of the coupler members. The character of locks embodying the resilient wedging action avoids the above noted objections but due to the resilience of the locking member the coupler members are likely to be rocked on their cams and thereby automatically disengaged when subjected to abnormal pull thereon, for example, when the flexible joints of metallic conduits between the cars are made relatively stiff and unyielding by the high fluid pressure therein, or when for any reason, abnormal pulls are imposed on the hoses.

The principal object of the present invention is to provide for hose couplings of the above character, an improved lock which will function to exert a resilient locking pressure on the mating coupler members during normal service conditions so as to avoid injuring the gaskets or other parts of the coupler members and which will also provide a rigid locking engagement of the couplers when the latter are subjected to forces tending to disconnect them while the locking elements are moved to their locking position.

A further object is to provide a locking device of the above character in which the impositive locking effect is obtained by reason of the resilience of the locking bar which is moved into locking position above the cam arm of a mating coupling member and to provide in connection with said spring locking bar an auxiliary spring element serving to hold the locking bar in its released position and providing also a resilient seat for the locking bar during the first portion of its movement toward its locking position.

A further and more specific object of the invention is to provide a reinforced bridge construction overlying the locking bar, the reinforcement of the bridge serving also as an abutment for the locking bar at a location near the inner face of the locking arm of the mating coupler so as to prevent any substantial upward rocking movement of the cam arm of the mating coupler.

Other objects and advantages will be apparent from the detailed description of one embodiment of the invention.

In the accompanying drawings:

Fig. 1 is a plan view of a hose coupler provided with a locking device constructed in accordance with the present invention, said coupler being mated with a coupler of known construction.

Fig. 2 is a view in side elevation of the construction shown in Fig. 1.

Fig. 3 is a plan view of a hose coupler embodying the present invention and illustrating the locking bar in its released position.

Fig. 4 is a fragmentary side elevation of the coupler shown in Fig. 3 illustrating a cam on the coupler hand engaged by one end of the locking bar.

Fig. 5 is a cross-sectional view through the hose coupler and its locking device showing the locking bar in its locking position.

Fig. 6 is a view similar to Fig. 5 but showing the locking bar moved to its released position, and Fig. 7 is a view in perspective of the locking bar.

The hose coupler embodying the present invention is of the straight port or gravity type and is designed to interlock with any of the various types of gravity hose couplers now in general use for releasably connecting together the steam train lines of adjacent railway cars.

In Figs. 1 and 2 of the drawings, the improved hose coupling designated generally by the reference letter A is shown coupled with a coupler B of well known construction. The improved coupler A may be described generally as consisting of a coupler head 10 adapted to be attached to the lower end 11 of a train pipe hose or other flexible conduit. The head is formed on one side with a cam lug 12 and on the other side with a forwardly projecting arm 13. The arm 13 and cam lug 12 of the improved coupler interlocks respectively with correspondingly shaped cam lug 12a and forwardly projecting arm 13a of the coupler B. The interlocking cam surfaces are so formed that the couplers A and B are brought into coupled relation and into horizontal alignment by a downward rocking movement of the coupler heads. In such position of the coupler heads the gaskets 14—14a arranged in the coupler ports, bear firmly against each other to provide a steam tight connection. The said mating couplers are disconnected from each other by an upward rocking movement of the coupler heads. Such disengaging rocking movement is sometimes brought about accidentally by abnormal pulls on the hose, for example when the train is rounding a curve. The tendency which the pulls on the hoses have to disconnect the couplers is present particularly when the hoses themselves are relatively stiff and unyielding, for example, when the hoses or the equivalent jointed metal conduits are made stiff by the high fluid pressure in the conduits.

In order to avoid accidental disconnection of the hose couplers, the mating coupler elements have been heretofore provided with some form of locking means. In the old form of coupler shown in Fig. 1 and designated B, the lock consists of a link 15 pivoted in a lug 16 and adapted to be driven into tight engagement with an upstanding lug 17 formed on coupler head 10.

The locking mechanism of the present invention is constructed to function normally as an impositive lock, but includes arrangements whereby a slight accidental rocking movement of the coupler heads in a direction to disconnect them, immediately brings into play a rigid locking action between the couplers. This rigid locking action continues until the stresses producing such rocking movements of the couplers are relieved, whereupon the locking device again functions as an impositive lock. Said improved locking device is positioned on the top of the coupler A and includes a bracket 18 preferably in the form of a bridge cast integral with the coupler head. A locking bar 19 preferably formed of resilient metal is intermediately pivoted on a screw stud 20 which extends downwardly from the bracket 18. The locking bar 19 is illustrated in its inoperative position in Fig. 3. It is moved to its operative position by swinging it about its pivotal axis until the upturned end 21 moves into engagement with the upper edge portion 22 of the mating coupler arm 13a. The portion of the locking bar adjacent the upturned end is so formed that the undersurface 23 thereof has a general wedge form so that it will readily engage over the upper edges of mating coupler arms of varying heights. The other end of the locking bar 19, while the bar moves to its locking position, bears on a supporting surface 24 formed on the coupler head 10 at a location remote from the pivotal axis of the locking bar. The said supporting surface is preferably in the form of a wedge cam so that movement of the end 25 of the bar thereover in the direction of the arrow in Fig. 1, exerts a tilting pressure on the bar which forces the end 21 of the bar downwardly on the upper edge 22 of the mating coupler arm 13a. The end of the locking bar which engages the wedge cam 24 is provided with a spring tongue 26 adapted to snap over the end 27 of the wedge cam (Fig. 4) to hold the locking bar in its locking position. This end of the bar is also bent downwardly from the plane of the bar, as shown at 28, to provide a suitable member adapted to be struck with a hammer when driving the locking bar to its locking position. A resilient member 29, preferably in the form of a coil spring, is interposed between the locking bar 19 and the under surface of the bracket 18 to provide a resilient fulcrum for the locking bar. The coil spring 29 and the pivot stud 20 incline downwardly from the top portion of the bridge toward the wedge cam surface 24 of the coupler head 10 so that the spring 29 will exert downward pressure on the locking-bar at substantially right angles to the plane of the bar when it is moved into locking engagement with mating coupler arms of varying heights. The coil spring 29 is preferably formed from material having flattened sides 30 so as to provide flat bearing surfaces between the several coils of the spring when it is fully compressed. The said spring member is preferably of sufficient length to press the locking bar 19 against the coupler head 10 and hold it from accidental displacement when the bar is inactive, as shown in Figs. 3 and 5 of the drawings.

When driving the locking bar from the position indicated in Fig. 3 toward the locking position indicated in Fig. 1, the initial movement of the bar compresses the spring 29 as the ends of the locking bar are forced over the mating coupler arm 13a and the wedge cam 24. After the spring 29 is fully compressed, further swinging movement of the bar 19 about its pivotal axis in a direction to increase the locking effect, produces an upward flexing of the opposite end portions of the locking bar. The coupler heads are, therefore, held in their normal interlocked relation by the resilience of the locking bar together with the downward force exerted by the coil spring 29. In order to convert the above normally resilient locking action into a positive locking engagement and thereby prevent disengagement of the coupler head when they are subjected to strains tending to rock them in directions to effect disengagement, the bridge 18 is formed to extend to a position relatively close to the inner face 31 of the mating coupler arm 13a and is formed also with a downwardly extended flange 32, which overlies the top surface of the locking bar 19. There is but a slight clearance between the locking bar 19 and the lower edge of the flange 32 of the bridge under normal conditions of service. Any slight rocking movement of the couplers A and B in a direction to disengage them, for example, abnormal pulls on the flexible conduits when the train is rounding a curve, moves the locking bar into engagement with the lower edge portion of the flange 32 and thereby prevents disengagement of the coupler heads. The above construction of the bracket or bridge 18, in addition to providing an abutment for limiting upward movement of the resilient bar 19, provides also additional strength and rigidity for the bridge member.

It will be apparent from the above description that the resilience of the spring bar 19 together with the pressure exerted by the coiled spring 29 will serve to force the arm 13a of the mating coupler downwardly and thereby bring the couplers A and B into normal horizontal alignment as soon as the abnormal strain tending to rock them out of such alignment is relieved and the said locking device thereafter functions as an impositive or resilient lock.

While the invention, for the purpose of convenience, has been illustrated in connection with one specific embodiment involving the use of a spring locking bar, it will be obvious that the invention is not to be confined to such specific structure, and that other modifications might be made without departure from the spirit of the invention. It will be therefore understood that the present invention contemplates all such changes in structure that come within the scope of the appended claims.

I claim:

1. A hose coupler comprising a head and a projecting arm adapted to engage respectively with the projecting arm and head of a mating coupler, a locking bar pivotally supported on said head and having a locking end movable into engagement with the arm of said mating coupler, means positioned between the intermediate portion of the locking bar and a part on the coupler head for exerting downward pression on the locking bar when said bar is in its locking position, and means on said head overlying the locking end portion of said bar in close proximity thereto at a location closely adjacent said mating coupler arm to provide an abutment for the locking end of said locking bar.

2. A hose coupler comprising a head and a projecting arm adapted to engage respectively with the projecting arm and head of a mating coupler, a spring locking bar intermediately pivoted on said head and movable into resilient locking engagement with said coupler head and the arm of said mating coupler, a resilient fulcrum for said locking bar comprising a coiled spring interposed between said bar and a part of the coupler head and adapted to limit the upward movement of said intermediate portion of the locking bar, and means on said coupler head overlying said locking bar but spaced therefrom at a location adjacent the arm of said mating coupler to limit the upward flexing of said locking bar.

3. A hose coupler comprising a head and a projecting arm adapted to engage respectively with the arm and head of a mating coupler, a bracket formed on said coupler head, a pivot stud extending downwardly from said bracket, a locking bar pivoted on said stud and movable into engagement with a part of the coupler head and the arm of the mating coupler, a coiled spring interposed between said bar and said bracket adapted to be compressed by movement of said bar into its locking position, and means formed on said bracket which overlies said locking bar in close proximity to the arm of said mating coupler and adapted to limit upward movement of said locking bar.

EDWARD A. RUSSELL.